United States Patent
Vasquez et al.

(10) Patent No.: US 8,606,921 B2
(45) Date of Patent: Dec. 10, 2013

(54) LOAD BALANCING BASED ON DEEP PACKET INSPECTION

(75) Inventors: Juan Vasquez, Tampa, FL (US);
Prashant Desai, Land O Lakes, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 366 days.

(21) Appl. No.: 12/853,401

(22) Filed: Aug. 10, 2010

(65) Prior Publication Data

US 2012/0041965 A1 Feb. 16, 2012

(51) Int. Cl.
*G06F 15/173* (2006.01)

(52) U.S. Cl.
USPC .......................... 709/226; 709/238; 709/245

(58) Field of Classification Search
USPC .................. 709/226, 227, 238, 245
See application file for complete search history.

(56) References Cited

U.S. PATENT DOCUMENTS

| | | | |
|---|---|---|---|
| 2007/0100960 A1* | 5/2007 | Eichstaedt et al. | 709/217 |
| 2009/0287846 A1* | 11/2009 | Iyengar et al. | 709/242 |
| 2011/0225594 A1* | 9/2011 | Iyengar et al. | 718/105 |
| 2011/0252127 A1* | 10/2011 | Iyengar et al. | 709/224 |

* cited by examiner

*Primary Examiner* — Phuoc Nguyen

(57) ABSTRACT

A device may receive a packet, determine a content identifier of the packet, identify a first processing device that has processed part of content associated with the content identifier, send the packet to the first processing device when the first processing device is identified, select a second processing device among a plurality of processing devices when the first processing device is not identified, and send the packet to the second processing device.

20 Claims, 9 Drawing Sheets

US 8,606,921 B2

LOAD BALANCING BASED ON DEEP PACKET INSPECTION

BACKGROUND

When a network load balancer receives a packet, the load balancer may select one of multiple devices that are to process the packet. The load balancer may select the processing device based on loads on the devices. The load balancer may send the packet to the selected processing device.

DETAILED DESCRIPTION

The following detailed description refers to the accompanying drawings. The same reference numbers in different drawings may identify the same or similar elements. As used herein, the term "deep packet inspection" may include inspecting contents (e.g., a payload) of a packet. For example, a router that is examining the layer 3 payload of a packet may be performing deep packet inspection.

Figure 1A:
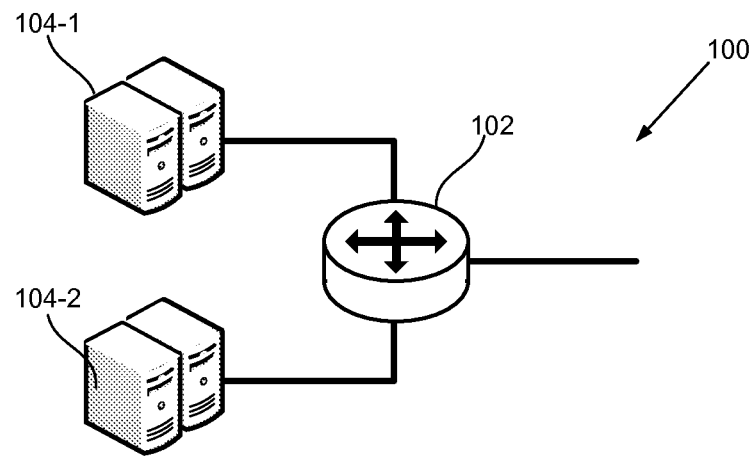
FIG. 1A illustrates an exemplary load balancing system.
Figure 1B:
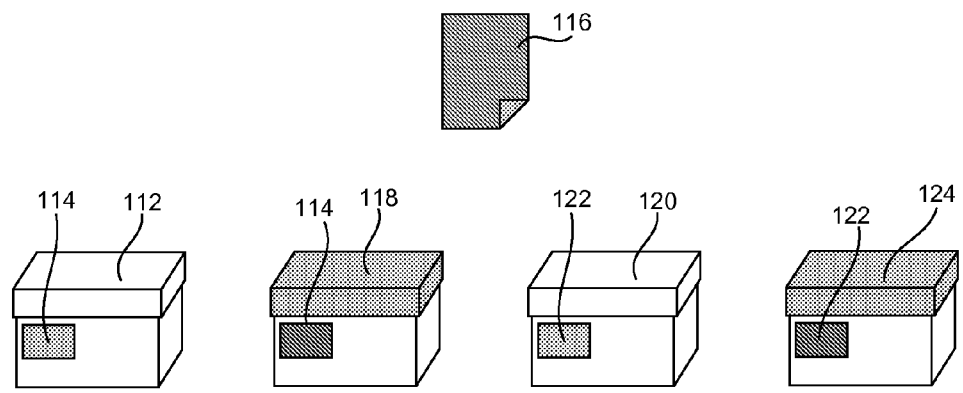
FIG. 1B illustrates exemplary data fragmentation caused by an exemplary load balancer of FIG. 1A according to one implementation.
Figure 1C:
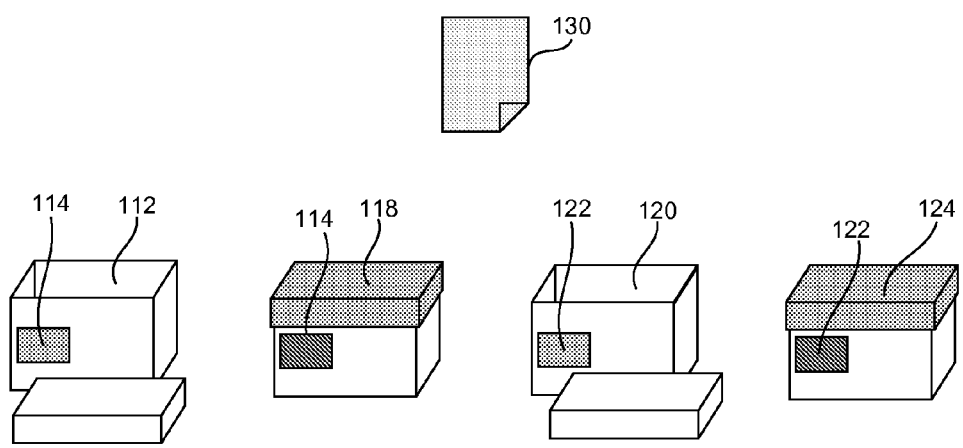
FIG. 1C illustrates exemplary load balancing performed by the load balancer of FIG. 1A according to another implementation.

As described below, a device may distribute received packets to processing devices based on deep packet inspection. FIGS. 1A through 1C illustrate concepts described herein. FIG. 1A shows an exemplary load balancing system. As shown, load balancing system 100 may include a load balancer device 102, processing device 104-1, and processing device 104-2 (herein as "processing device 104" or "processing devices 104").

Load balancer device 102 relays incoming packets to either processing device 104-1 or processing device 104-2 in accordance with a load balancing scheme (e.g., a packet distribution scheme). Processing device 104 processes packets that are received from load balancer device 102 (e.g., record a piece of data carried by the packet, fetch a web page, perform an e-transaction, etc.).

In system 100, at processing devices 104, the results of processing packets whose data is part of the same content may later be organized into a single unit of data. For example, assume that packets that carry audio data of a song arrive at load balancer device 102; that load balancer device 102 distributes the packets to processing devices 104; and that processing devices 104 record the data from the packets. Once the recordings are complete, a network device (e.g., processing device 104-1, 104-2, or another device (not shown)) may assemble the recordings into a copy of the song. The recordings may be easier to assemble if the data are sequentially recorded at one processing device 104, rather than fragmented over both processing devices 104.

FIG. 1B illustrates exemplary data fragmentation caused by load balancer device 102 according to one implementation. Assume that signal packets 112 and 120 provide signaling for the same communication session; that data packets 118 and 124 carry data from the same communication session; that each of packets 112 and 118 includes addresses 114; and that each of packets 120 and 124 includes addresses 122.

When load balancer device 102 receives signal packet 112, load balancer device 102 associates processing device 104-1 with addresses 114 of signal packet 112, and records the association/assignment in a table 116 (e.g., a database). Load balancer device 102 sends signal packet 112 to processing devices 104 to be recorded.

When data packet 118 (having address 114) arrives at load balancer device 102, load balancer device 102 searches table 116 to identify processing device 104-1 that is assigned to addresses 114, and sends data packet 118 to processing device 104-1. Consequently, signal packet 112 and data packet 118 may be recorded at the same processing device 104-1. In this scenario, there is no data fragmentation.

Assume that toad balancer device 102 receives signal packet 120. Because signal packet 120 has address 122 different from address 114, table 116 may fail to identify a processing device. Consequently, load balancer device 102 may assign or associate, possibly a. different processing device, such as processing device 104-2 with addresses 122. Load balancer device 102 sends signal packet 120 to processing devices 104 to be recorded. In this scenario, although packets 112 and 120 may be sent to the same processing devices 104, processing devices 104 may not recognize that packets 112 and 120 belong to the same session, and store contents of packets 112 and 120 in two fragments.

If data packet 124, which includes addresses 122, follows packet 120 into load balancer device 102, load balancer device 102 may route data packet 124 to processing device 104-2 based on the new association between address 122 and processing device 104-2 in table 116. This may cause the data from packets 118 and 124 to be distributed over two different processing devices 104-1 and 104-2 and result in further fragmentation of the data.

FIG. 1C illustrates exemplary load balancing performed by load balancer device 102 according to another implementation. In this implementation, load balancer device 102 may balance load based on deep packet inspection. This may reduce or eliminate the data fragmentation described above with reference to FIG. 1B.

Assume that signal packets 112 and 120 carry the same content identifier (e.g., the same SIP call ID), since packets 112 and 120 provide signaling for the same communication session.

When load balancer device 102 receives signal packet 112, load balancer device 102 extracts the content identifier from the payload of signal packet 112, associates processing device 104-1 and addresses 114 with the content identifier, and records the association in a table 130. Load balancer device 102 then sends packet 112 to processing device 104-1 to be recorded.

When data packet 118 arrives at load balancer device 102, load balancer device 102 searches table 130, using addresses 114 of data packet 118 as a key. Accordingly, load balancer 102 retrieves the content identifier and identifies processing device 104-1. Consequently, load balancer device 102 sends data packet 118 to processing device 104-1 to be recorded.

When load balancer device 102 receives signal packet 120, load balancer device 102 performs a lookup, in table 130, using the content identifier as a key. Although addresses 122 of signal packet 120 are different from addresses 114 of packet 112, by using the content identifier as a key in its lookup, load balancer device 102 still identifies processing device 104-1 and sends packet 120 thereto. In contrast to the corresponding scenario described with reference to FIG. 1B, the contents of packets 112 and 120 are recorded in one processing device 104-1.

In FIG. 1C, when load balancer device 102 receives signal packet 120, in addition to sending signal packet 120 to processing device 104-1, load balancer device 102 replaces the association between addresses 114 and processing device 104-1 with an association between addresses 122 and processing device 104-1. Accordingly, when data packet 124 arrives at load balancer device 102, load balancer device 102 may use addresses 122 as a key to search table 130 and identify processing device 104-1. Hence, load balancer may send packet 124 to processing device 104-1. This allows the data in packets 118 and 124 to be recorded in one processing device 104-1.

Figure 2:
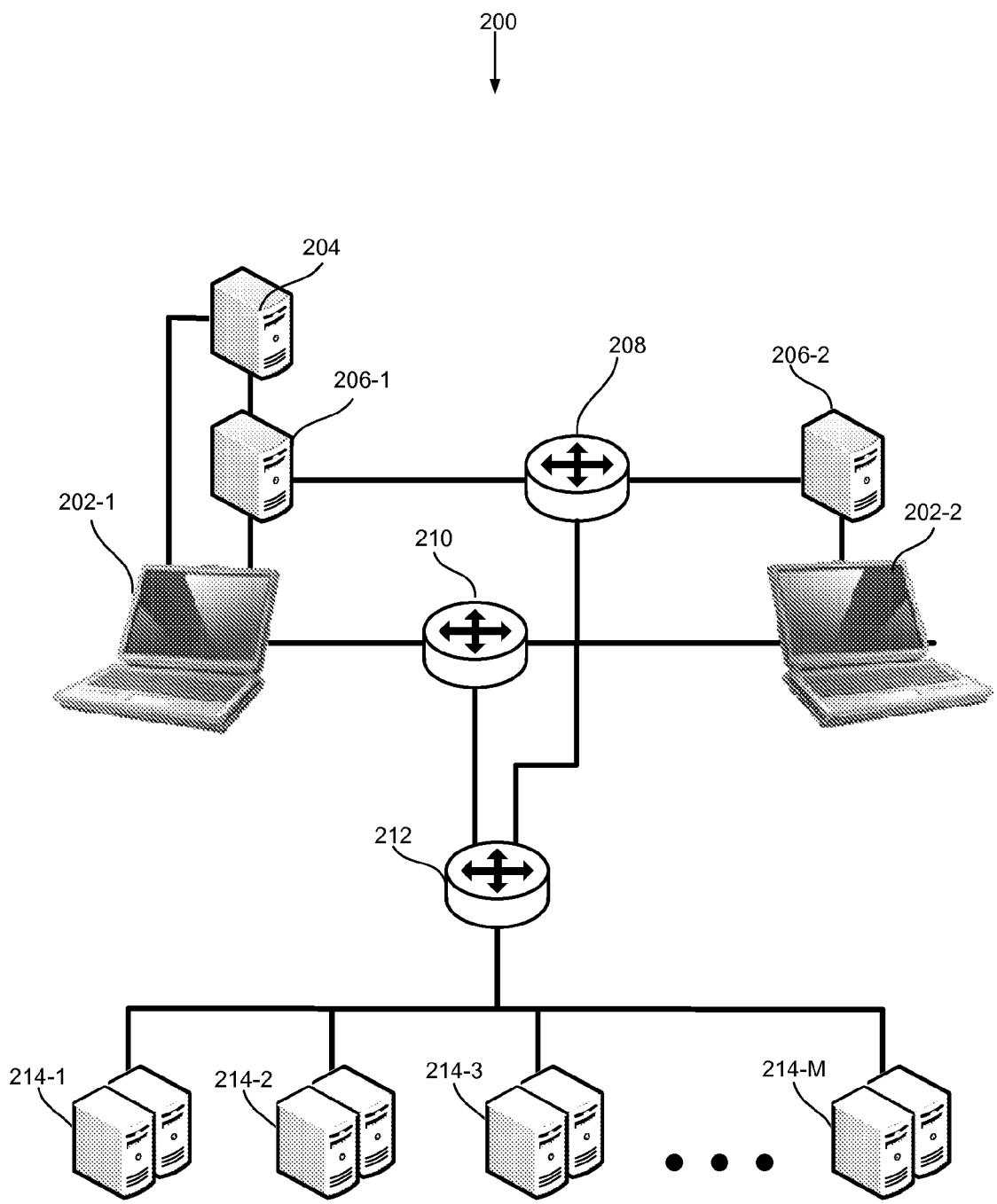
FIG. 2 shows an exemplary network in which concepts described herein may be implemented.

FIG. 2 illustrates an exemplary network in which concepts described herein may be implemented. Network 200 may include one or more wired and/or wireless networks that are capable of exchanging information, such as voice, video, documents, multimedia, text, etc. For example, network 200 may include one or more public switched telephone networks (PSTNs) or another type of switched network. Network 200 may also include a number of transmission towers for receiving wireless signals and forwarding the signals toward the intended destination. Network 200 may further include one or more packet switched networks, such as an Internet protocol (IP) based network, a local area network (LAN), a wide area network (WAN), a personal area network (PAN), an intranet, the Internet, or another type of network that is capable of exchanging information.

As shown, network 200 may include user devices 202-1 and 202-2 (herein "user device 202" or "user devices 202"), a registrar device 204, proxy server devices 206-1 and 206-2 (herein "proxy server device 206" or "proxy server devices 206"), a signal copy device 208, a media copy device 210, a load balancer device 212, and processing devices 214-1 through 214-M (herein "processing device 214" or "processing devices 214"). In FIG. 2, network devices 202 through 214 may communicate via links that are illustrated as solid lines. For simplicity, FIG. 2 does not show other communication links (e.g., communication links between registrar device 204 and proxy server 206-2, between signal copy device 208 and media copy device 210, etc.) and elements of network, such as routers, bridges, switches, gateways, wireless access points, hubs, etc.

In the following, for simplicity, network devices 202-214 are described as applying Session Initiation Protocol (SIP), Session Description Protocol (SDP), and Real-time Transport Protocol (RTP). Depending on the implementation, other communication protocols, such as H.323, Media or Multimedia Gateway Control Protocol (MGCP), etc. may also be applied to the concepts described herein.

User devices 202 may communicate with one another over network 200. In one implementation, user devices 202-1 and 202-2 may host or operate as SIP clients (e.g., SIP phones). The SIP clients may create, send, and/or receive SIP messages. In addition, the SIP clients may send or receive a media stream (e.g., RTP stream). To allow other devices in network 200 to locate the SIP clients, the SIP clients may register at registrar device 204.

Registrar device 204 may store information about SIP clients. In addition, registrar device 204 may provide the stored information to other devices in network 200. Proxy server device 206 may forward a SIP message to its intended destination. In addition proxy server device 206 may locate SIP clients and provide information about the SIP clients to other network devices or components (e.g., a software component).

Signal copy device 208 may create a copy of a signal packet (e.g., a packet that includes signaling information (e.g., a SIP packet)) between proxy server devices 206 and provide the copy to processing device 214 via load balancer device 212.

Media copy device 210 may copy packets of a media stream between user devices 202 and provide the copies to processing device 214 via load balancer device 212. By exchanging SIP messages, user devices 202 may establish a RTP channel between one another. The RTP channel may then be used to send or receive the media stream (e.g., voice data, video, etc.) between user devices 202.

Load balancer device 212 may receive copies of signal packets and a media stream from signal copy device 208 and media copy device 210, respectively. In addition, load balancer device 212 may select one of processing devices 214 and send the received copies to the selected processing device 214.

Processing device 214 may receive copies of signal packets and a media stream and process them. In one implementation, processing device 214 may record the copies in the order that they are received, for further processing or use.

Depending on the implementation, network 200 may include additional, fewer, different, or different arrangement of devices than those illustrated in FIG. 2. For example, in one implementation, network 200 may include redirect server devices, additional user devices, additional proxy server devices, additional registrar devices, etc. In another example, the functionalities of one or more devices 202-214 may be integrated into other devices 202-214. For example, registrar device 204 may be combined with proxy server device 206-1.

Figure 3:
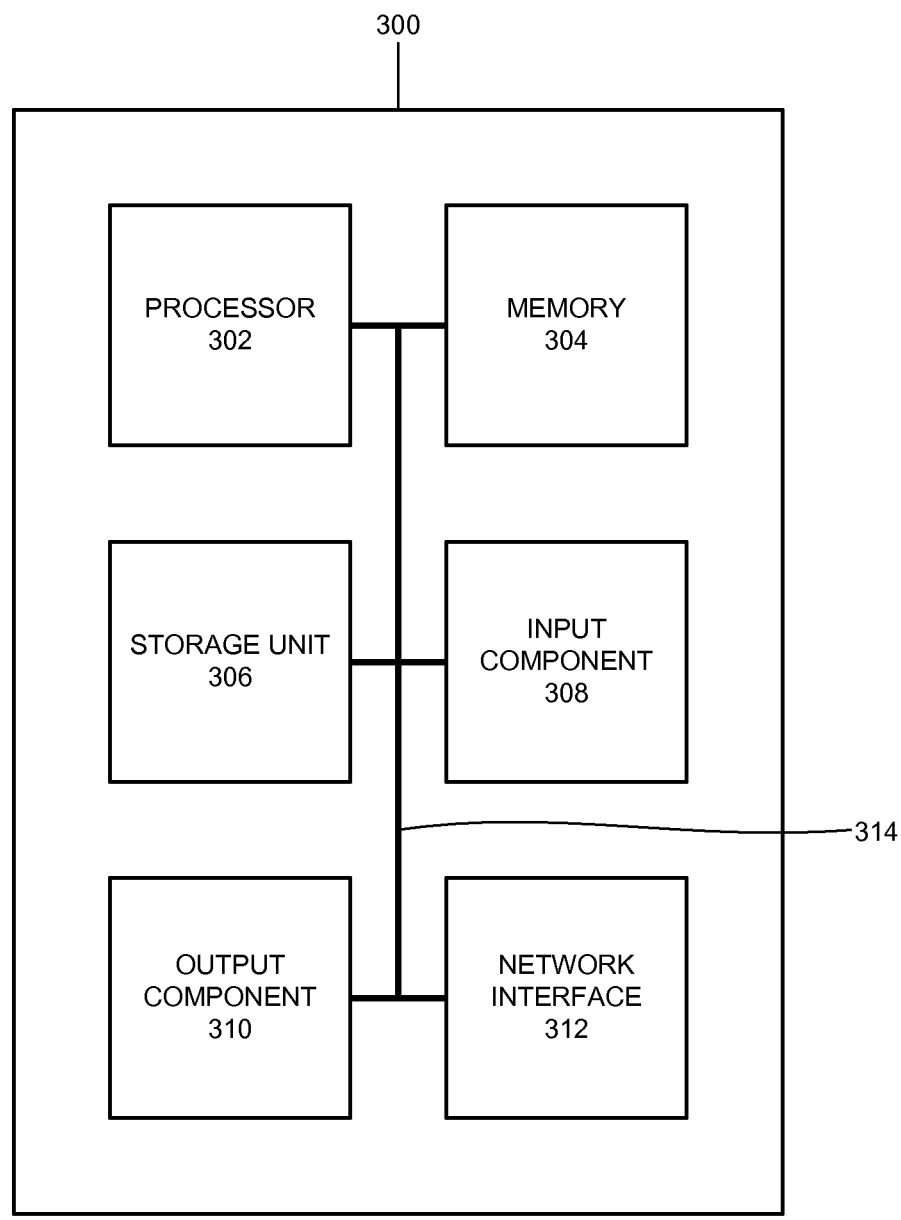
FIG. 3 is a block diagram of exemplary components of an exemplary network device of FIG. 2.

FIG. 3 is a block diagram of an exemplary network device 300, which may correspond to one or more of devices 202-214. As shown, network device 300 may include a processor 302, memory 304, storage unit 306, input component 308, output component 310, network interface 312, and communication path 314. In different implementations, network device 300 may include additional, fewer, different, or different arrangement of components than the ones illustrated in FIG. 3. For example, network device 300 may include line interfaces, such as interfaces for receiving and forwarding data.

Processor 302 may include a processor, a microprocessor, an Application Specific Integrated Circuit (ASIC), a Field Programmable Gate Array (FPGA), and/or other processing logic capable of controlling network device 300. Memory 304 may include static memory, such as read only memory (ROM), and/or dynamic memory, such as random access memory (RAM), or onboard cache, for storing data and machine-readable instructions (e.g., programs, scripts, etc.). Storage unit 306 may include a floppy disk, CD ROM, CD read/write (R/W) disc, and/or flash memory, as well as other types of storage devices for storing data and/or machine-readable instructions (e.g., a program, script, etc.).

Input component 308 and output component 310 may provide input and output from/to a user to/from network device 300. Input/output components 308 and 310 may include a display screen, a keyboard, a mouse, a speaker, a microphone, a camera, a DVD reader, Universal Serial Bus (USB) lines, and/or other types of components for converting physical events or phenomena to and/or from signals that pertain to network device 300.

Network interface 312 may include a transceiver (e.g., a transmitter or receiver) for network device 300 to communicate with other devices and/or systems. For example, via network interface 312, network device 300 may communicate over a network, such as the Internet, an intranet, a terrestrial wireless network (e.g., a WLAN, WiFi, WiMax, etc.), a satellite-based network, etc. Network interface 312 may include a modem, an Ethernet interface to a LAN, and/or an interface/connection for connecting network device 300 to other devices (e.g., a Bluetooth interface).

Communication path 314 may provide an interface through which components of network device 300 can communicate with one another.

Figure 4:
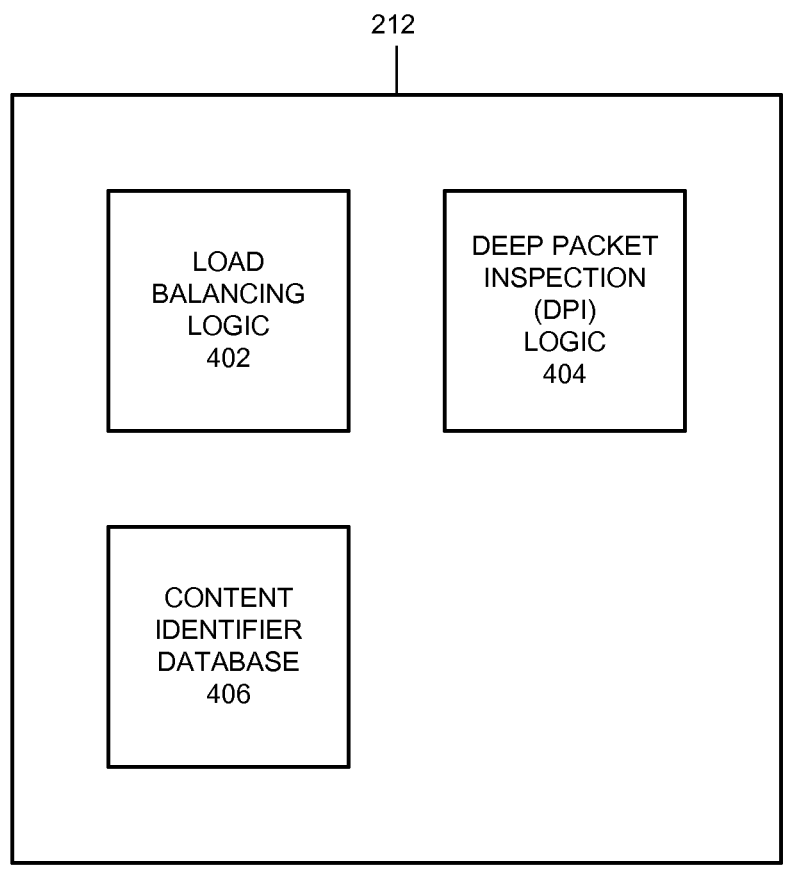
FIG. 4 is a block diagram of exemplary functional components of an exemplary load balancer device of FIG. 2.

FIG. 4 is a block diagram of functional components of load balancer device 212. As shown, load balancer device 212 may include load balancing logic 402, deep packet inspection (DPI) logic 404, and a content identifier database 406. For simplicity, FIG. 4 does not show other components, such as an operating system, device drivers, etc. Depending on the implementation, load balancer device 212 may include additional, fewer different, or different arrangement of functional components than those illustrated in FIG. 4.

Load balancing logic 402 may distribute packets received from signal copy device 208 and media copy device 210 to processing devices 214 based on a load balancing scheme. In some implementations, the load balancing scheme may include processing at least two different types of packets, signal packets and data packets.

When load balancing logic 402 receives a signal packet (e.g., a SIP packet) that belongs to a particular call/session between user devices 202, load balancing logic 402 may perform a deep packet inspection of the packet. Via deep packet inspection logic 404, load balancing logic 402 may extract a content identifier (e.g., a SIP call identifier) in the payload of the signal packet.

If the content identifier is not in content identifier database 406, load balancing logic 402 may associate a processing device 214 (selected based on load balancing criteria (e.g., processing load on processing devices 214)), a pair of network addresses (e.g., source IP address and destination IP address) and the content identifier. The network addresses may be provided in the header of the received signal packet. Load balancing logic 402 may store the associations in content identifier database 406.

If the content identifier is found in content identifier database 406, load balancing logic 402 may still associate a pair of network addresses (e.g., source and destination IP addresses) provided in the header of the signal packet with the content identifier, and consequently, with processing device 214 previously associated with the content identifier. Load balancing logic 402 may overwrite, with the new association, any old association between the content identifier and other network addresses. Subsequently, load balancing logic 402 may send the signal packet to the processing device 214.

When load balancing logic 402 receives a data packet (e.g., a copy of a packet in a media stream between user devices 202), load balancer device 212 may obtain a pair of network addresses (e.g., source IP address and destination IP address) provided in the header of the received data packet. Furthermore, using the addresses, load balancing logic 402 may perform a lookup of processing device 214 that is associated with the network addresses. Load balancing logic 402 may send the data packet to the identified processing device 214.

Deep packet inspection logic 404 may examine contents (e.g., the payload) of a packet (e.g., a signal packet (e.g., a SIP packet)), extract a piece of information within the contents, and/or identify the piece of information within the contents. For example, deep packet inspection logic 404 may extract a SIP call identifier from within the payload of a SIP packet on behalf of load balancing logic 402.

Figure 5A:
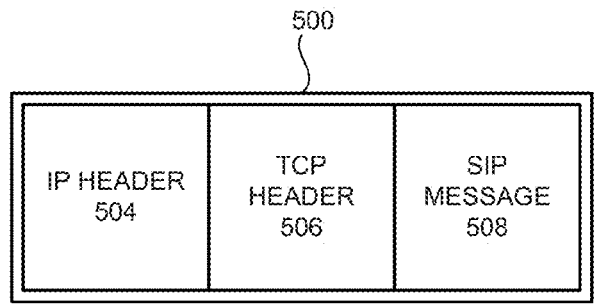
FIG. 5A depicts an exemplary Session Initiation Protocol (SIP) packet.

FIG. 5A depicts an exemplary SIP packet 500. Deep packet inspection logic 404 may examine SIP packet 500 to extract a content identifier (e.g., a SIP call ID). As shown in FIG. 5A, SIP packet 500 may include an IP header 504, a Transmission Control Protocol (TCP) header 506, and a SIP message 508. For simplicity, packet 500 does not show other components of packet 500.

IP header 504 and TCP header 506 may include information for a network to provide reliable transport services to SIP packet 500. IP header 504 and TCP header 506 may include, for example, source and destination IP addresses, source and destination port numbers, a packet sequence number, etc.

Figure 5B:
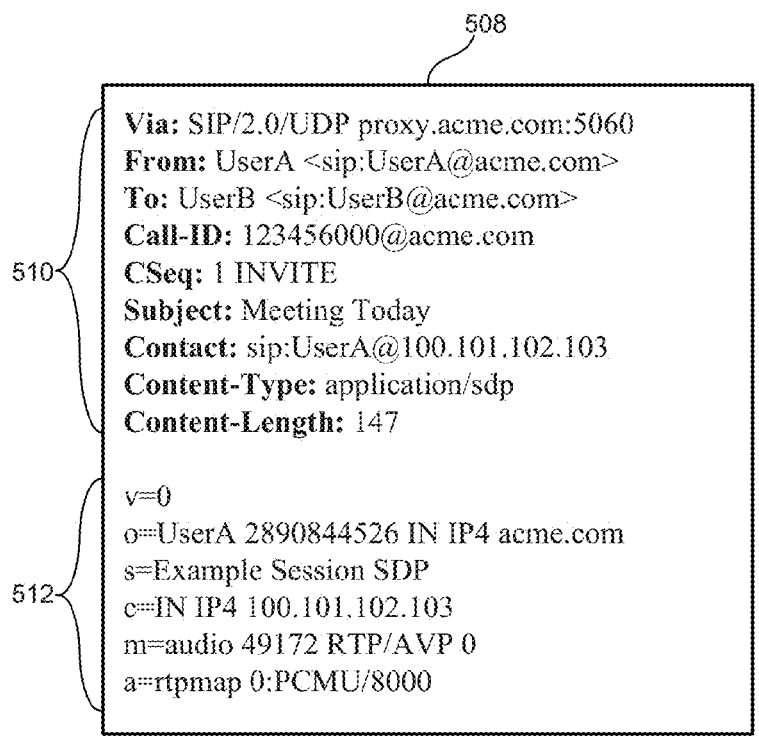
FIG. 5B depicts an exemplary SIP message of FIG. 5A.

SIP message 508 may include a type of message under the SIP, such as, for example, a REGISTER message, INVITE message, ACK message, CANCEL message, BYE message, OPTIONS message, error message, etc. FIG. 5B shows an exemplary SIP message 508 (e.g., INVITE message). As shown, SIP message 508 may include a SIP message header 510 and a SIP message body 512.

SIP message header 510 may include a call identifier (call ID), information about user agents that are to send/receive SIP packet 500, an indication of the type of SIP message 508, an indication of the type of information in the body of SIP message 508, etc.

SIP message body 512 may include, for example, a SDP message that describes a RTP media stream. Based on the SDP message, user devices 202-1 may send or receive a RTP media stream. The media stream may include RTP packets. In FIG. 2, media copy device 210 may send copies of RTP packets from the media stream to load balancing device 212.

Figure 5C:
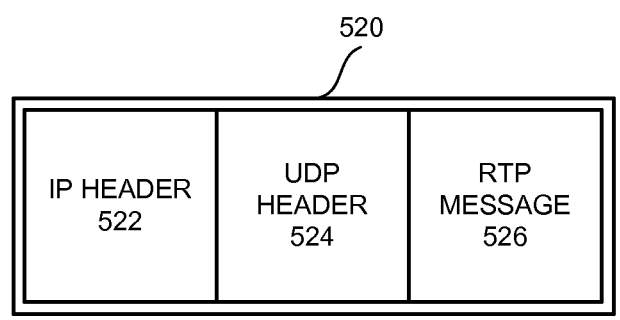
FIG. 5C depicts an exemplary real-time transport protocol (RTP) packet.

FIG. 5C depicts an exemplary RTP packet 520. As shown, RTP packet 520 may include an IP header 522, a User Datagram Protocol (UDP) header 524, and a RTP message 526. IP header 522 and UDP header 524 may include information for a network to provide a transport service to RTP packet 520. RTP message 526 may include a portion of the media stream. For simplicity, RTP packet 520 does not show other information that RTP packet 520 may include.

Figure 6:
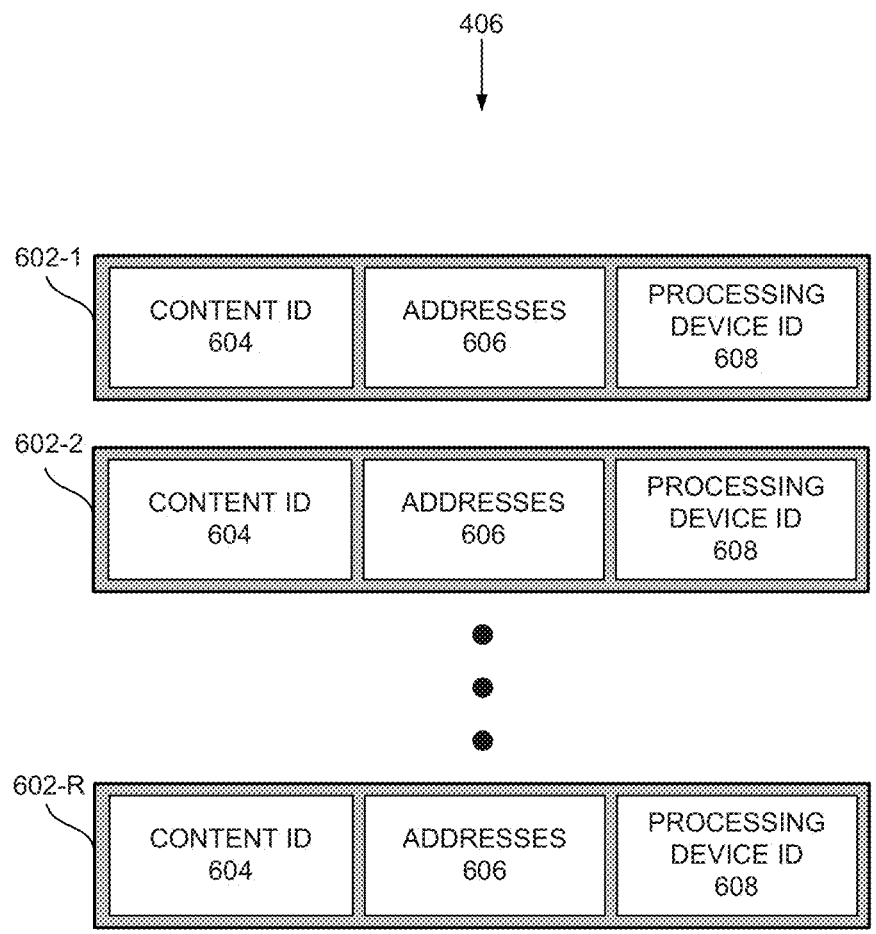
FIG. 6 shows exemplary records of an exemplary content identifier database of FIG. 4.

Returning to FIG. 4, content identifier database 406 may include one or more records pertaining to content identifiers. Content identifier database 406 may be implemented as a table, list, hash table, etc. FIG. 6 shows exemplary records of content identifier database 406. As shown, content identifier database 406 may include records 602-1 through 602-R (herein "records 602" or "record 602").

As further shown, each record 602 may include a content identifier field 604, an addresses field 606, and a processing device identifier field 608. Depending on the implementation, record 602 may include additional, fewer, different, or different arrangement of fields than those illustrated in FIG. 6.

Load balancing logic 402 may create and/or modify each of fields 604-608 in record 602 when load balancing logic 402 receives a signal packet. In addition, based on the content identifier provided in the signal packet, load balancing logic 402 may look up record 602 to identify processing device 214 to which a data packet or the signal packet is to be sent.

Content identifier field 604 may include an identifier that a signal packet carries in its payload. The identifier may be associated with content whose portions are included in data packets of a media stream. For example, in one implementation, a signal packet may include an SIP call ID as part of SIP message 508. The SIP call ID may identify a particular communication session between user agents that are hosted on user devices 202.

Addresses field 606 may include a source address and a destination address of a signal packet received by load balancing logic 402.

Processing device identifier field 608 may include an identifier that is associated with processing device 214 that load balancing logic 402 has selected to process signal packets and data packets. The payloads of the data packets may include content identified by the content identifier in content identifier field 604.

Figure 7:
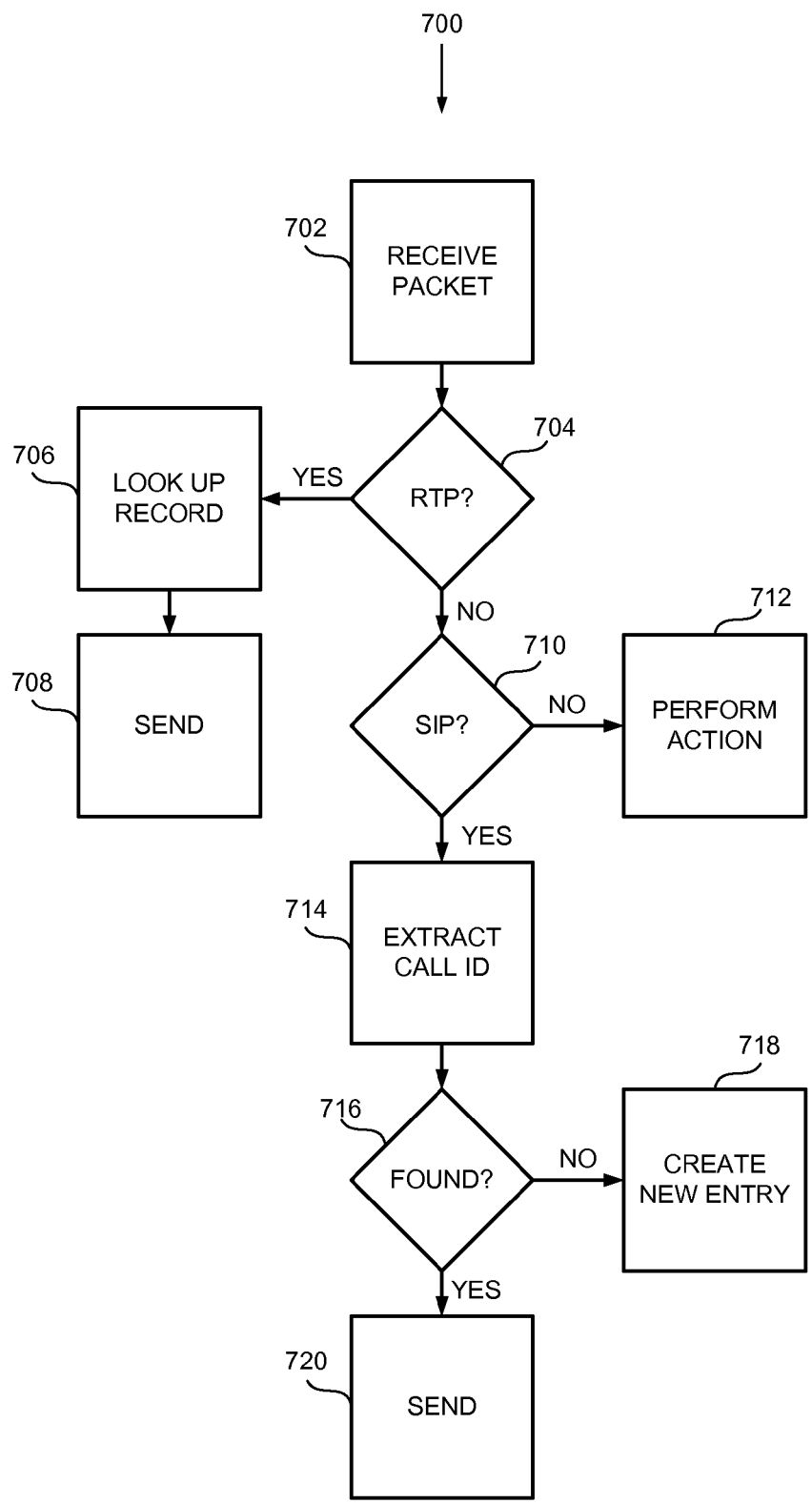
FIG. 7 is a flow diagram of an exemplary process for load balancing based on deep packet inspection.

FIG. 7 is a flow diagram of an exemplary process 700 for load balancing based on deep packet inspection. Process 700 may begin when load balancing device 212 receives a packet (block 702).

Load balancing device 212 may determine whether the packet is a RTP packet (block 704). For example, load balancing logic 402 may determine whether the packet is a RTP packet based on deep packet inspection (e.g., by determining whether the payload of the packet includes a RTP message).

If the packet is an RIP packet (block 704—YES), load balancing logic 402 may look up record 602 whose addresses (e.g., data stored in addresses field 606) matches the network addresses of the RIP packet (block 706). The record 602 may identify, in processing device identifier field 608, processing device 214 that is assigned to the content identifier. Load balancing device 212 may send the RIP packet to the identified processing device 214 (block 708) to be recorded.

If the packet is not an RIP packet (block 704—NO), load balancer device 212 may determine whether the packet is a SIP packet (block 710) based on deep packet inspection. If the packet is not a SIP packet (block 710—NO), load balancer device 212 may perform an implementation dependent action (block 712) (e.g., notify a network operator of an error, follow an instruction specified in the packet, communicate with another device, etc.).

If the packet is a SIP packet (block 710—YES), load balancer device 212 may extract a call identifier from the SIP packet (block 714). Via deep packet inspection, load balancer device 212 may extract the call identifier from SIP message 508 in the SIP packet.

Load balancer device 212 may look up the call identifier in content identifier database 406. If record 602 with the matching call identifier is found (block 716—YES), load balancer device 212 may send the SIP packet to processing device 214 that is identified by processing device identifier field 608 in record 602 (block 720). In addition, load balancer device 212 may update record 602, if necessary, with addresses of the SIP packet (e.g., the addresses of the SIP packet is not the same one in record 602).

Otherwise (block 716—NO), load balancer device 212 may create a new record 602 (block 718). Content identifier field 604 of new record 602 may include the content identifier extracted from the SIP packet (see block 714). Addresses field 606 of new record 602 may include source and destination addresses that are provided in the header of the SIP packet. Processing device identifier field 608 may include an identifier (e.g., a network address, a domain name, etc.) of processing device 214 that load balancing device 214 has selected for processing signal packets and data packets. The signal packets may bear the content identifier. The data packets may include headers whose addresses match the addresses provided in addresses field 606 of new record 602.

In selecting particular processing device 214, load balancer device 212 may weigh several factors. The factors may include, for example, for each processing device 214, processor utilization, storage utilization (e.g., load balancer 212 may not select processing device 212 without space on its storage unit 306), memory utilization, network traffic, etc. When processing device 602 receives the packet (e.g., RTP packet or SIP packet) from load balancer device 212, processing device 602 may record information provided by the packet (e.g., header information, data in its payload, etc.).

In the foregoing description, load balancing device 212 may select processing device 214 to process packets that are associated with a particular content identifier. By sending packets that are associated with the particular content identifier to the same processing device 214, load balancing device 212 may avoid fragmenting data that belongs to a whole over several processing devices 214. This may allow the data to be readily reassembled to recover the whole.

The foregoing description of implementations provides illustration, but is not intended to be exhaustive or to limit the implementations to the precise form disclosed. Modifications and variations are possible in light of the above teachings or may be acquired from practice of the teachings.

For example, while series of blocks have been described with regard to an exemplary process illustrated in FIG. 7, the order of the blocks may be modified in other implementations. In addition, non-dependent blocks may represent acts that can be performed in parallel to other blocks.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

No element, act, or instruction used in the present application should be construed as critical or essential to the implementations described herein unless explicitly described as such. Also, as used herein, the article "a" is intended to include one or more items. Further, the phrase "based on" is intended to mean "based, at least in part, on" unless explicitly stated otherwise.

What is claimed:
1. A method comprising:
receiving, by a load balancing device, a packet;
determining whether the packet is a Real-time Transport Protocol (RTP) packet;
identifying, responsive to determining that the packet is an RTP packet, a processing device corresponding to stored addresses matching network addresses associated with the RTP packet;
sending the RTP packet to the identified processing device;
determining, responsive to determining that the packet is not an RTP packet, whether the packet is a Session Initiation Protocol (SIP) packet;
extracting, responsive to determining that the packet is a SIP packet, a content identifier of the SIP packet;
identifying a first processing device that has processed part of content associated with the content identifier;

sending the SIP packet to the first processing device when the first processing device is identified;
selecting a second processing device among a plurality of processing devices when the first processing device is not identified; and
sending the SIP packet to the second processing device.

2. The method of claim 1, wherein
determining that the packet is not a SIP packet includes determining that the content identifier does not correspond to a call identifier of a SIP session, the method further comprising:
performing in implementation-dependent action with respect to the packet.

3. The method of claim 1, wherein determining that the packet is an RTP packet includes:
determining that a payload of the packet includes an RTP message.

4. The method of claim 1, wherein identifying the first processing device includes:
performing a lookup of the content identifier in a database to locate a record that identifies the first processing device.

5. The method of claim 1, wherein determining whether the packet is an RTP packet includes:
obtaining the network addresses of the packet; and
performing a lookup of the network addresses in the database to locate the stored addresses.

6. The method of claim 1, wherein extracting the content identifier of the packet includes:
performing a deep packet inspection to extract a call identifier from within a payload of the SIP packet.

7. The method of claim 1, wherein selecting the second processing device includes:
selecting the second processing device among the processing devices based on, at each of the devices, at least one of:
processing load, available storage, available memory, and network traffic.

8. The method of claim 1, wherein selecting the second processing device includes:
associating a call identifier in a payload of the SIP packet with network addresses of the SIP packet; and
inserting the association in the database.

9. The method of claim 1, further comprising:
storing the SIP packet at the first processing device.

10. A device comprising:
a receiver to receive a packet;
a processor to:
determine whether the received packet is a Real-time Transport Protocol (RTP) packet;
identify, responsive to a determination that the received packet is an RTP packet, a processing device corresponding to stored addresses matching network addresses associated with the RTP packet,
determine, responsive to a determination that the received packet is not an RTP packet, whether the received packet is a Session Initiation Protocol (SIP) packet;
identify, responsive to a determination that the received packet is a SIP packet, a content identifier of the SIP packet;
identify a first processing device associated with the content identifier; and
select a second processing device among a plurality of processing devices when the first processing device is not identified; and
a transmitter to:
send the RTP packet to the identified device;
send the SIP packet to the first processing device when the first processing device is identified; and
send the SIP packet to the second processing device when the first processing device is not identified.

11. The device of claim 10, wherein the received packet includes one of:
a H.323 packet or a Media Gateway Control Protocol (MGCP) packet.

12. The device of claim 10, wherein the content identifier includes:
a Session Initiation Protocol (SIP) call identifier.

13. The device of claim 10, wherein the received packet includes:
a payload that includes the content identifier of the SIP packet.

14. The device of claim 10, further comprising:
a memory to store a database, and
wherein when the processor identifies the first processing device, the processor is configured to:
perform a lookup of the content identifier in the database to locate a record that identifies the first processing device.

15. The device of claim 10, wherein when the processor determines that the received packet is an RTP packet, the processor is further configured to:
obtain network addresses of the received packet from packet headers; and
perform a database lookup of the identified processing device using the network addresses as a key.

16. The device of claim 10, wherein when the processor selects the second processing device, the processor is configured to factor in, for each of the processing devices, at least one of:
processing load, available storage, available memory, or network traffic.

17. A system comprising:
a load balancing device configured to:
receive a packet;
determine whether the packet is a Real-time Transport Protocol (RTP) packet;
identify, responsive to a determination that the packet is an RTP packet, a processing device corresponding to stored addresses matching network addresses associated with the RTP packet;
send the RTP packet to the identified processing device;
determine, responsive to determination that the packet is not an RTP packet, that the packet is a Session Initiation Protocol (SIP) packet;
identify a content identifier associated with the SIP packet;
identify a first processing device that has processed part of content associated with the content identifier;
select a second processing device among a plurality of processing devices when the first processing device is not identified;
send the SIP packet to the first processing device when the first processing device is identified; and
send the SIP packet to the second processing device when the first processing device is not identified.

18. The system of claim 17, wherein the system further comprises:
the second device configured to:
copy a Session Initiation Protocol packet in transit between two user agents to generate the SIP packet; and
send the SIP packet to the load balancing device.

19. The system of claim 17, further comprising the first processing device, wherein the first processing device is configured to record the SIP packet.

20. The system of claim 17, wherein the RTP packet includes:

a Real-time Transport Protocol (RTP) message.

* * * * *